(12) United States Patent
Baracchino

(10) Patent No.: US 10,640,086 B2
(45) Date of Patent: May 5, 2020

(54) MOTORCYCLE WITH SYSTEM OF AUTHORIZATION CONTROL

(71) Applicant: PIAGGIO & C. SPA, Pontedera (Pisa) (IT)

(72) Inventor: Luigi Baracchino, Pontedera (IT)

(73) Assignee: PIAGGIO & C. SPA, Pontedera (Pisa) (IT)

( * ) Notice: Subject to any disclaimer, the term of this patent is extended or adjusted under 35 U.S.C. 154(b) by 8 days.

(21) Appl. No.: 16/302,713

(22) PCT Filed: May 11, 2017

(86) PCT No.: PCT/IB2017/052756
§ 371 (c)(1),
(2) Date: Nov. 19, 2018

(87) PCT Pub. No.: WO2017/199139
PCT Pub. Date: Nov. 23, 2017

(65) Prior Publication Data
US 2019/0118772 A1 Apr. 25, 2019

(30) Foreign Application Priority Data
May 17, 2016 (IT) .......................... 102016000050564

(51) Int. Cl.
*B60R 25/04* (2013.01)
*B62K 5/01* (2013.01)
(Continued)

(52) U.S. Cl.
CPC ............ *B60R 25/241* (2013.01); *B60R 25/04* (2013.01); *B60R 25/2018* (2013.01); *B62H 5/08* (2013.01);
(Continued)

(58) Field of Classification Search
CPC ................ B60R 25/04; B60R 25/2018; B60R 2325/101; B60R 2325/105;
(Continued)

(56) References Cited

U.S. PATENT DOCUMENTS 6,151,541 A * 11/2000 Iizuka ................. G06F 11/1441
365/228
7,482,907 B2 1/2009 Denison
(Continued)

FOREIGN PATENT DOCUMENTS

| EP | 1081001 A2 | 3/2001 |
| EP | 1445180 A1 | 8/2004 |

(Continued)

OTHER PUBLICATIONS

International Search Report for corresponding application PCT/IB2017/052754 filed on May 11, 2017: Report dated Aug. 30, 2017.
(Continued)

*Primary Examiner* — Hieu T Vo
(74) *Attorney, Agent, or Firm* — Cantor Colburn LLP

(57) ABSTRACT

A motorcycle (1) including: an electronic system of authorization control (100,200); wherein: a first electronic control unit (200) is adapted and configured to determine whether the motorcycle (1) is in an authorized or non-authorized usage state and is adapted to interrogate a portable transponder, which can have a master identification electronic code or a slave identification electronic code, in order to acquire said electronic code and to verify if said electronic code is correct; and wherein: if the first control unit (200) acquires the master identification electronic code, starting the traction engine is allowed independently from the second electronic control unit; if the first control unit (200) acquires the slave identification electronic code, it is determined that the motorcycle (1) is in the authorized usage state and starting (Continued)

the traction engine is allowed if it receives consent information from the second electronic control unit (100).

18 Claims, 4 Drawing Sheets

(51) Int. Cl.

| | | |
|---|---|---|
| *G06Q 20/40* | (2012.01) | |
| *H04L 9/14* | (2006.01) | |
| *B60R 25/24* | (2013.01) | |
| *B62H 5/08* | (2006.01) | |
| *G06Q 30/06* | (2012.01) | |
| *G07F 17/00* | (2006.01) | |
| *B62K 19/46* | (2006.01) | |
| *G07C 9/00* | (2020.01) | |
| *B60R 25/20* | (2013.01) | |
| *B62K 5/08* | (2006.01) | |
| *B62K 5/05* | (2013.01) | |
| *B62K 5/10* | (2013.01) | |
| *B62K 5/027* | (2013.01) | |
| *G06Q 20/08* | (2012.01) | |
| *G06Q 10/08* | (2012.01) | |
| *B62J 7/00* | (2006.01) | |

(52) U.S. Cl.
CPC ............... *B62J 7/00* (2013.01); *B62K 5/027* (2013.01); *B62K 5/05* (2013.01); *B62K 5/08* (2013.01); *B62K 5/10* (2013.01); *B62K 19/46* (2013.01); *G06Q 10/0833* (2013.01); *G06Q 20/085* (2013.01); *G06Q 20/40* (2013.01); *G06Q 30/0645* (2013.01); *G07C 9/00309* (2013.01); *G07F 17/0057* (2013.01); *H04L 9/14* (2013.01); *B60R 2325/101* (2013.01); *B60R 2325/105* (2013.01); *B60R 2325/108* (2013.01); *B60R 2325/205* (2013.01); *B60R 2325/306* (2013.01); *B62K 2202/00* (2013.01); *G07C 2209/04* (2013.01)

(58) Field of Classification Search
CPC ........ B60R 2325/108; B60R 2325/205; B60R 2325/306; B62K 5/027; B62K 5/05; B62K 5/08; B62K 5/10; B62K 19/46; B62K 2202/00; G06Q 10/0833; G06Q 20/085; G06Q 20/40; G06Q 30/0645
See application file for complete search history.

(56) References Cited

U.S. PATENT DOCUMENTS

| | | | |
|---|---|---|---|
| 7,498,688 B2 * | 3/2009 | Kamiya | ............ B60R 25/02153 307/10.2 |
| 2004/0168663 A1 | 9/2004 | Matsuura | |
| 2010/0071427 A1 | 3/2010 | Tsuruta | |
| 2010/0073130 A1 | 3/2010 | Tsuruta | |
| 2010/0077807 A1 | 4/2010 | Takeuchi | |
| 2019/0199524 A1 * | 6/2019 | Takemori | ............... H04L 9/0861 |

FOREIGN PATENT DOCUMENTS

| | | |
|---|---|---|
| FR | 3022672 A1 | 12/2015 |
| JP | 2004116261 A | 4/2004 |
| JP | 2004217139 A | 8/2004 |
| TW | 270493 B | 1/2007 |
| WO | 9947393 A2 | 9/1999 |
| WO | 2013177331 A1 | 11/2013 |

OTHER PUBLICATIONS

International Search Report for corresponding application PCT/IB2017/052756 filed May 11, 2017; dated Aug. 22 2017.
Written Opinion for corresponding application PCT/IB2017/052754 filed on May 11, 2017: Report dated Aug. 30, 2017.
Written Opinion for corresponding application PCT/IB2017/052756 filed May 11, 2017; dated Aug. 22, 2017.

\* cited by examiner

MOTORCYCLE WITH SYSTEM OF AUTHORIZATION CONTROL

FIELD OF THE INVENTION

The present invention relates to the technical field of motorcycles and in particular it relates to a motorcycle with system of authorization control.

STATE OF THE ART

Recently, renting and sharing cars as well as motorcycles is becoming increasingly widespread. By sharing it is intended a short term rental, usually priced according to the time of usage (typically in hours and/or fractions of hours) and/or according to the mileage.

However, in the motorcycle sharing field, peculiar safety problems occur so that these types of vehicles are vulnerable to theft/vandalism events or negligence by distracted users thus making the management of the motorcycle fleets for rental use particularly expensive for field operators, on top of compromising in some cases the possibility to rent motorcycles, with severe inconveniences both for operators and for end users.

The object of the present disclosure is to make available a motorcycle enabling to solve or reduce at least partially the above described drawbacks with reference to the above described prior art motorcycles.

Such an object is obtained by a motorcycle as generally defined in claim 1. Preferred and advantageous embodiments of the aforesaid motorcycle are defined in the enclosed claims.

The invention shall be better understood through the following detailed disclosure of one particular embodiment for exemplary and non-limiting purposes, referring to the enclosed drawings synthetically described in the following paragraph.

DETAILED DESCRIPTION

In the enclosed figures same or similar elements will be referred to by the same reference numbers.

Figure 1:
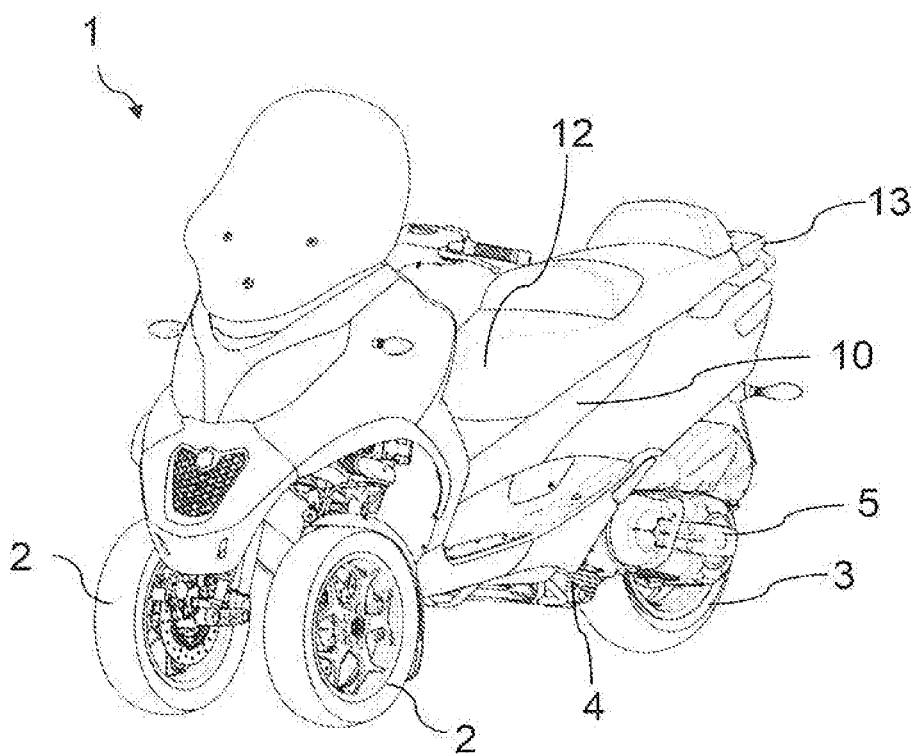
FIG. 1 shows a perspective view of one exemplary non-limiting embodiment of a motorcycle having a storage container.
Figure 2:
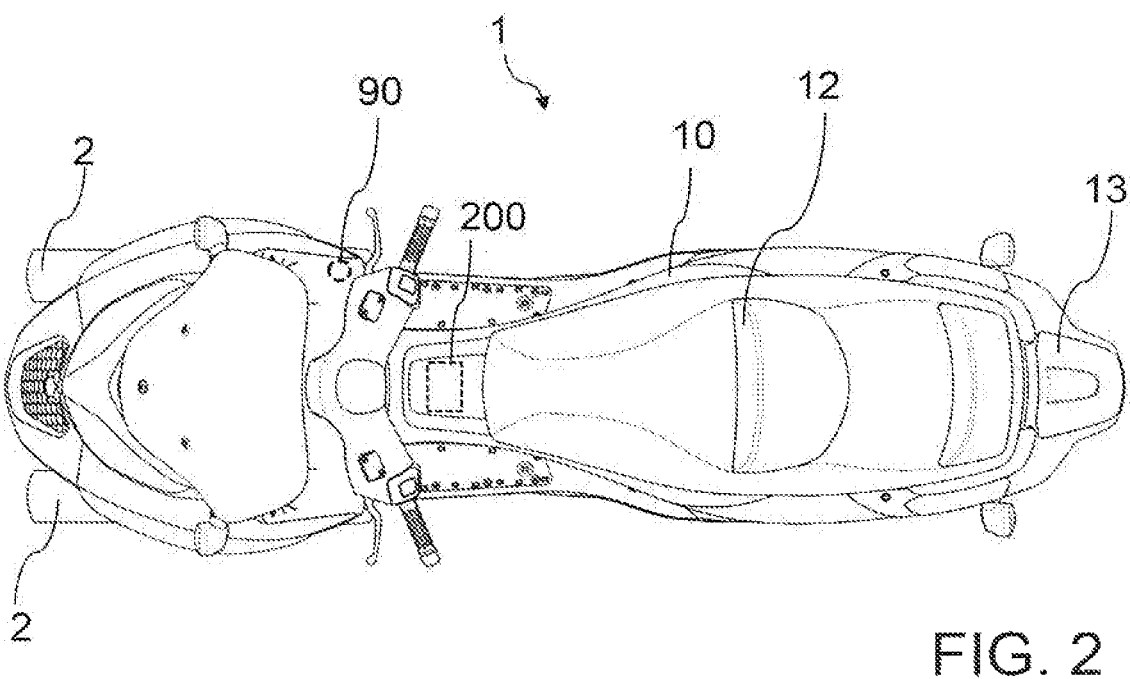
FIG. 2 shows a view from above of the motorcycle of FIG. 1.
Figure 3:
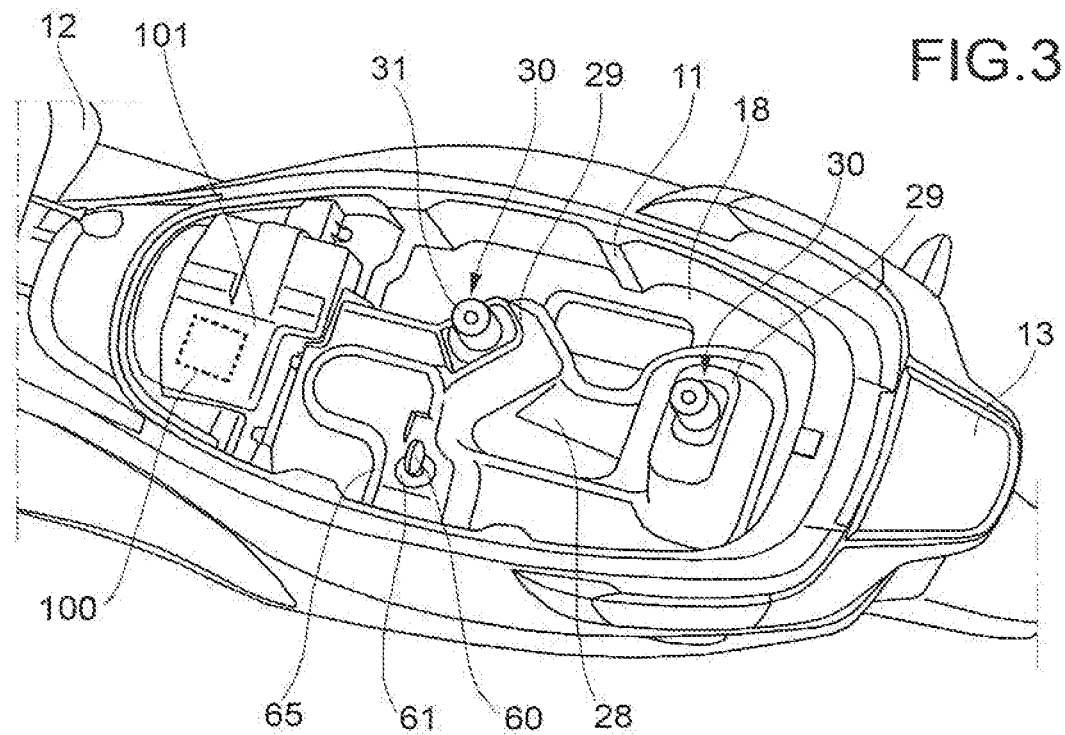
FIG. 3 is a first internal view of one preferred embodiment of the storage container of the motorcycle of FIG. 1.
Figure 4:
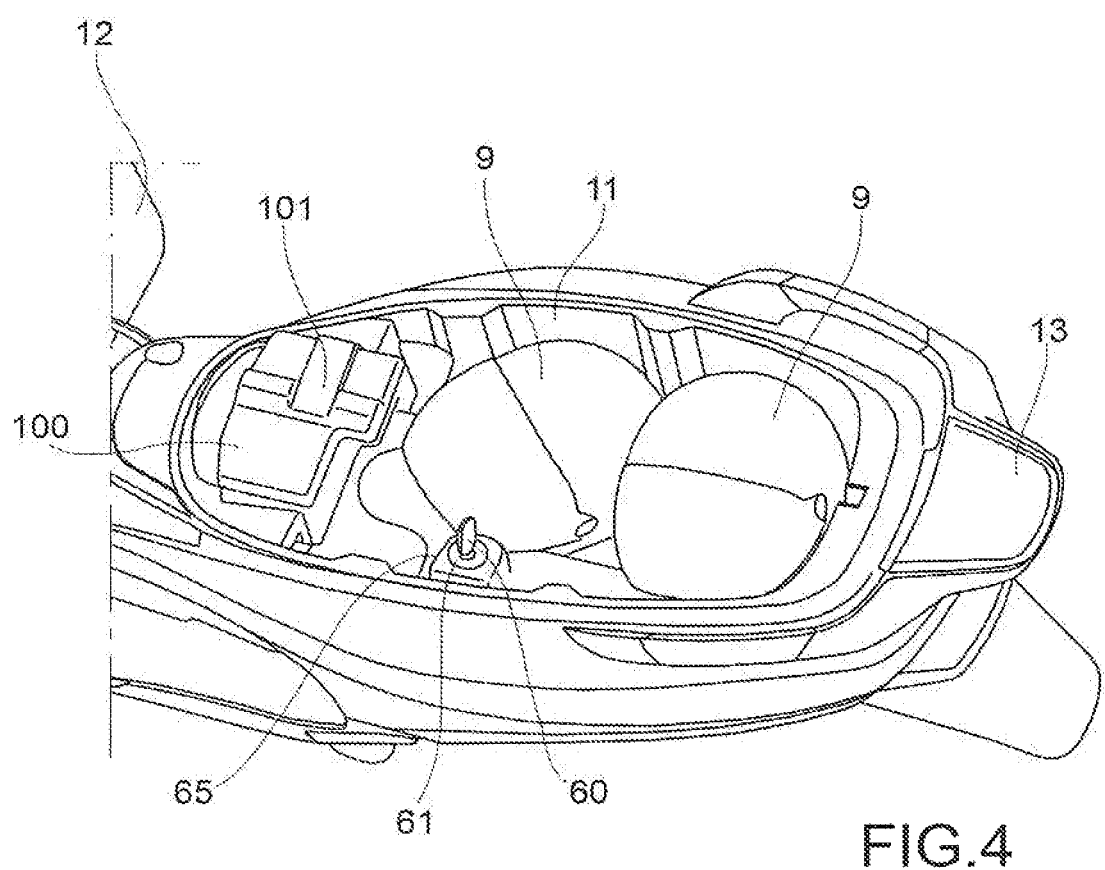
FIG. 4 shows a second internal view of the storage container of FIG. 3 wherein two objects are housed inside the container, in particular two helmets.

In FIGS. 1 and 2 one first embodiment of a motorcycle 1 is shown, which in the particular example is embodied, without limitation, by a three-wheel motorcycle or tricycle, including two front steering wheels 2 and one back wheel 3.

In the hereinafter description reference will be made to a generic motorcycle 1, thereby meaning that the following description is applicable in general to any type of motorcycle 1 including:
- a supporting structure;
- at least two wheels 2,3 directly or indirectly constrained to the supporting structure;
- a traction engine 4, for example thermal or electric or hybrid, constrained to the supporting structure and a transmission system 5 adapted to transmit the motion from the traction engine 4 to at least one of the two wheels 2,3.

The supporting structure is for example the frame of motorcycle 1 or any motorcycle structure 1 coupled to the motorcycle frame and having a supporting function for other structural elements of the motorcycle 1.

The motorcycle 1 includes a storage container 10 fixed, directly or indirectly, to the supporting structure of the motorcycle 1 having an internal compartment 11 and a closing device 12 movable with respect to the supporting structure between a closing position and an opening position in order to prevent the access to the internal compartment 11 in the closing position and to allow the access to the internal compartment 11 in the opening position. In the particular represented example, the storage container 10 is provided in the motorcycle body 1 and is placed beneath the saddle 12, which in this case represents the closing device 12 of the storage container 10. In this non-limiting example, the closing device 12 is a device pivotable with respect to the supporting frame and it is in particular pivotable with respect to the supporting structure of the motorcycle 1.

In one possible embodiment alternative to the one above described and not shown in the figures, the storage container 10 might be external from the motorcycle body 1, for example it might be a top box fixed to a luggage rack 13 provided at the rear of the motorcycle. In one further alternative embodiment the storage container might be provided at the front hull of the motorcycle 1.

The motorcycle 1 includes an electronic system of authorization control.

The electronic system of authorization control includes a first electronic control unit 200 and a second electronic control unit 100 operatively interconnected to each other.

Preferably the first electronic control unit 200 is the ECU (Engine Control Unit) of the motorcycle 1. Preferably the second electronic control unit 100 is a unit intended to carry on safety functions and/or functions related to the motorcycle 1 rental. In this case the second electronic control unit 100 is preferably arranged inside the storage container 10, for example inside a closed compartment 101.

The first electronic control unit 200 is adapted and configured to establish whether the motorcycle 1 is in an authorized or non-authorized usage state. The first electronic control unit 200 is adapted to interrogate a portable transponder 60, which can have a master identification electronic code or a slave identification electronic code, in order to acquire said electronic code and to verify if said electronic code is correct.

Preferably, the portable transponder 60 is a mechanical key with electronic identification code. Hereinafter, in the present disclosure the portable transponder 60 shall also be called transponder 60 or key 60. For ease of explanation the master identification electronic code shall also be called master code and the slave electronic identification code shall also be called slave code.

The first electronic control unit 200 is adapted and configured such that:
- if the first control unit 200 acquires the master identification electronic code, it is such to determine that the motorcycle 1 is in the authorized usage state and it is such to allow starting the traction engine independently from the second electronic control unit 100;
- if the first control unit 200 acquires the slave identification electronic code it is such to determine that the motorcycle 1 is in the authorized usage state and to allow starting the traction engine 4 if it receives consent information from the second electronic control unit 100.

For the purposes of what above disclosed by "to allow starting the traction engine independently from the second electronic control unit 100" it is meant that preferably in this case the first electronic control unit 200 can start the engine traction 4 without the consent of the second electronic control unit 100, or without an answer from the second electronic control unit 100, or without the presence of the second electronic control unit 100, or due to an interruption of the connection between said control units 100, 200, etc.

According to an advantageous embodiment, the first 200 and the second electronic control unit 100 are such to communicate with each other by means of encrypted digital signals. Preferably said signals are encrypted by an encryption key of which a first part is univocally paired to the first electronic control unit 200 and a second part is univocally paired to the second electronic control unit 100. During the assembling step of the motorcycle 1, a pairing process can be provided so that the two electronic units 100, 200 can be obviously paired to each other to communicate by means of encrypted digital signals, being coded and encoded by both units 100, 200.

According to one preferred and non-limiting embodiment, the system of authorization control includes one LIN BUS or a CAN BUS which interconnects the first 200 and the second 100 electronic control unit between each other.

According to one embodiment, the system of authorization control includes one first interrogating device 90 of the portable transponder 60 operatively connected to the first electronic control unit 200. Preferably, the system of authorization control includes a second interrogating device 61 of the portable transponder 60 operatively connected to the first electronic control unit 200, spatially separated from the first interrogating device and housed in a protected access container 10 of the motorcycle 1. For example, such protected-access container is the storage container 10.

According to one embodiment, the second electronic control unit 100 includes a wireless communication interface in order to exchange signals between the second electronic control unit 100 and a remote control centre. For example the aforesaid communication interface is adapted and configured to enable the electronic control unit 100 to communicate in a bidirectional way on a telecommunication network of a telecommunication operator, which is for example a long-range communication interface GSM, GRPS, UMTS, or a short-range interface such as a Wi-Fi or Bluetooth interface adapted to connect to a smart phone in order to communicate in any case through a telecommunication network of a telecommunication operator.

Preferably the second electronic control unit 100 is such that it receives consent information from the remote control centre which is for example the control centre of the rental service provider (for example of the sharing service). Preferably such information consent is representative of a rental authorization of the motorcycle 1 provided by the remote control centre.

According to one advantageous and non-limiting embodiment, the storage container 10 includes at least one presence detector 30 adapted to output an electrical signal representative of the presence and/or absence of at least one object 9 in the internal compartment 11 of the storage container 10. Conveniently, as in the example represented in the figure, the presence detector 30 is housed in the internal compartment 11 of the storage container 10. By electrical signal representative of the presence and/or absence of an object it is intended one electrical signal which is in a first state when the object 9 is inside the storage container 10 and is in a second state when the object 9 is not inside the storage container 10.

According to one embodiment, the aforesaid storage container 10 is adapted and configured to house at least an object in the form of a helmet 9, that is a protection device adapted to be worn by a driver or by a motorcycle passenger 1. In the particular represented example, the aforesaid storage container 10 is adapted and configured to house two helmets, for example two jet helmets. Furthermore, in the particular represented example, the storage container 10 includes two presence detectors 30, each adapted to detect the presence and/or the absence of a respective helmet 9 in the storage container 10.

According to one advantageous and non-limiting embodiment, the presence detector 30 includes one slider 31, being slidable, that is adapted and configured to slide between a forward operative position and a backward operative position and vice versa. Preferably, in the presence of an object 9 in the internal compartment 11 of the storage container 10, the slider 31 is such to assume the forward position as a result of a force being applied by the object 9 to the slider 31. In the example represented in the Figures, the slider 31 is such to assume a forward position when a helmet 9 is placed on it, as a result of the weight alone of the helmet 9 and eventually of the pressure force applied on the helmet 9 when the closing device, namely the saddle 12, is in the closing position, provided that the closing device 12 rests on the helmet 9 in such closing position.

According to one embodiment, the presence detector includes a switch 40, for example a normally closed switch, operatively connected to the slider 31 in order to be opened or closed by the slider 31 according to whether the slider 31 is in the forward position or in the backward position. For the purposes of the present description, by forward or backward position it is meant respectively a forward or backward position of the slider 31 with respect to the switch 40.

Preferably the switch 40 includes one mobile arm 41 adapted and configured to be moved by the slider 31 resulting from the sliding of the latter between the backward and forward position and vice versa. The mobile arm 41 may for example be pivotable and/or foldable.

The mobile arm 41 may be for example an electrically conductive arm adapted to close and open an electrical circuit thus representing in this case a mobile contact element of the switch 40. In one alternative embodiment the mobile arm 41 may be a member in turn able to move a mobile contact element of the switch 41 other than the arm itself.

Figure 5:
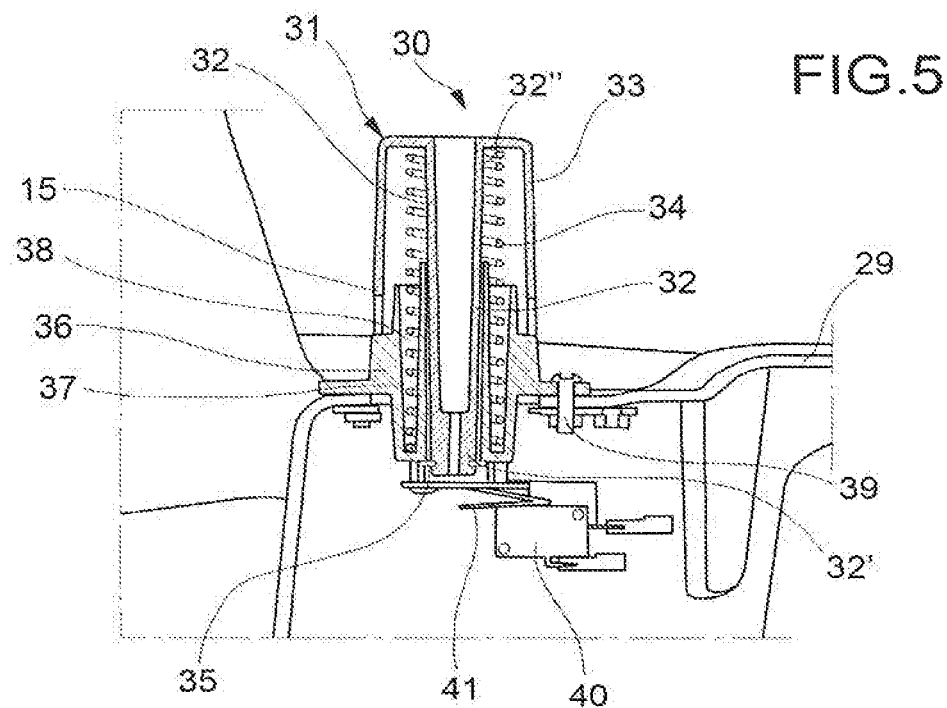
FIG. 5 shows a lateral cross section view of an objects presence detector of the storage container of FIG. 3.
Figure 6:
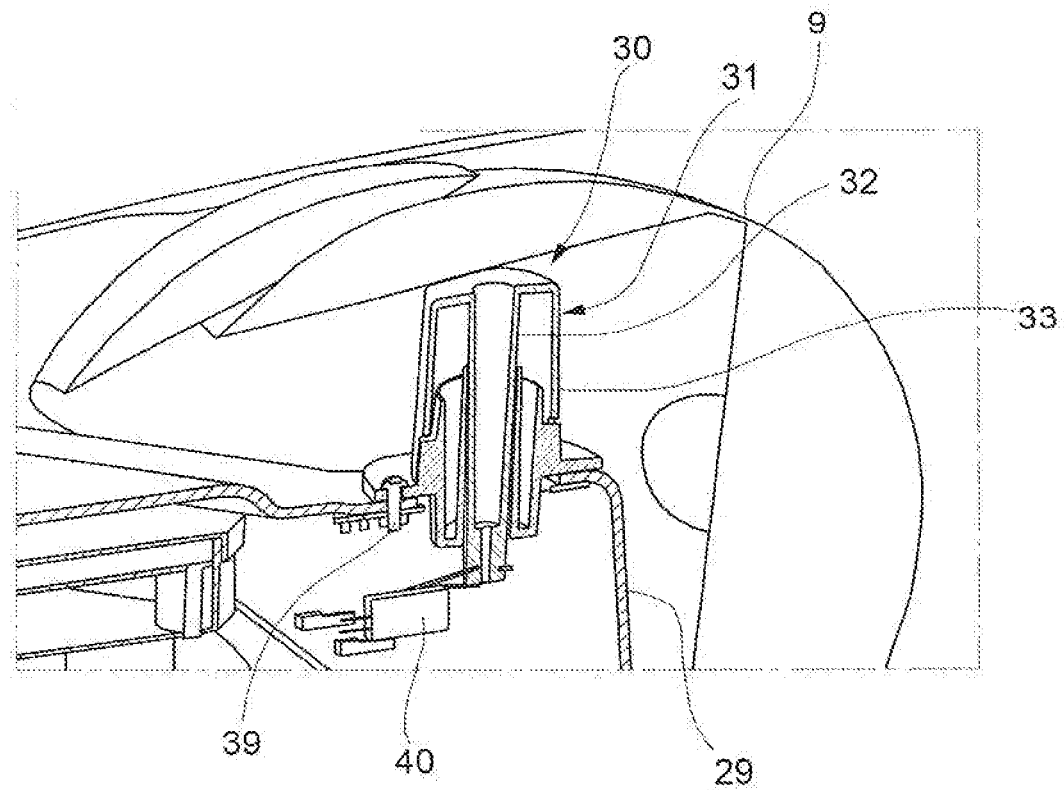
FIG. 6 shows a lateral cross section view of the objects presence detector of FIG. 5 wherein a helmet is placed on the detector.

Referring to FIGS. 5 and 6, according to one embodiment the slider 31 includes one stem 32. For example, such stem 32 has an end portion 32' adapted to abutting interfere with the mobile arm 41 of the switch when the slider 31 is in the forward position. Preferably, the slider 31 includes one cover element 33 arranged externally with respect to the stem 32 which is shaped in the example as a glass or an over-turned vase. An end portion 32" opposite to the end portion 32' of the stem 32 is fixed to the cover element 33.

According to one embodiment, the presence detector 30 includes a guide rail 36 defining a sliding axis of the slider 31. For example such guide rail 36 includes a pass-through channel 37 adapted to be passed through by a portion of the slider 31 and, in the particular example shown in the figures, by the stem 32 of the slider 31. Preferably, the guide rail 36 includes an external recess 38 coaxial to the pass-through channel 37. The presence detector 30 preferably includes one elastic return element 34 adapted to maintain and/or return the slider 31 into the backward position without external forces. In the example, such an elastic return element 34 is an helicoidal spring which is operatively inserted between the slider 31 and the guide rail 36. For example such spring is at least partially received in the recess 38 of the guide rail 36.

According to one embodiment, the slider 31 includes a first end of stroke element 35 adapted to define the backward position of the slider 31. For example such a end of stroke element 35 includes one ring fixed to the end portion 32' of the stem 32 of the slider 31, protruding laterally outwardly with respect to such end portion 32'. Preferably, the slider 31 also includes a second end of stroke 15 adapted to define the forward position of the slider 31. For example the second end of stroke element 15 includes a peripheral edge of the cover element 33, which in the example is a circular edge, adapted to abut with one abutting wall of the guide rail 36 through the passage of the slider 31 from the backward position to the forward position.

Preferably, the aforesaid guide rail 36 is fixed to a storage container 10 wall arranged in the internal compartment 11. In the example the guide rail 36 is fixed through one or more fixing elements 39, for example through one or more screws or pins 39.

According to one advantageous embodiment, the storage container 10 includes a bottom wall 18 and a supporting wall 29 of the presence detector 30 spaced apart from the bottom wall 18. For example, the guide rail 36 is fixed to the supporting wall 29. Conveniently, the supporting wall 29 is such that it can be at least partially received in a recess inside the object 9, having for example the shape of a tower raising from the bottom wall. For example, in case the object 9 is a helmet, the supporting wall 29 is such that it can be received inside the helmet 9 when the helmet 9 is housed inside the storage container 10 so that the slider 31 is in abutment with an internal wall of the helmet 9.

Preferably, the supporting wall 29 is part of a segregation panel 28 fixed inside the storage container defining a closed and protected section in the internal compartment 11 separated by a remaining part of the internal compartment 11. Such section houses one or more electronic devices, as for example the switch 40 of the storage container 10.

Preferably the second electronic control unit 100 is operatively connected to the presence detector 30, for example through electrical conducers, and it is adapted and configured to receive the electrical signal provided by the presence detector 30 and to discern the presence or absence of the object 9 inside the storage container 10.

As already stated, according to one advantageous embodiment, the second electronic control unit 100 is adapted and configured to remotely receive an authorization signal for the rental of the motorcycle 1. Without introducing any limitation, it is for example possible to envisage that the rental (e.g. the sharing, thereby intending the short term rental) is authorised if the motorcycle 1 is in the parking state, if the user has been recognized as an authorized user and if the presence detector 30 detects the presence of the object 9 inside the storage container 10, for instance the presence of one or two helmets 9. In addition or in alternative, the presence of the object 9 inside the storage container 10 (for example the presence of one or two helmets belonging to the rental kit including the motorcycle 1 provided by the rental provider operator), may determine the condition through which a rental control system (e.g. remote) may detect or authorize the end of a rental state by an user. Thereby an user, once parked the motorcycle 1 with the intention to end the rental, will be taught and/or led to place the helmet inside the container 10 or not to take it unduly from the rental service provider in order to avoid the rental pricing to continue even after he has left the vehicle and/or to avoid to receive fines and/or complaints by the competent bodies.

In addition or in alternative to what has been described, it is possible to adopt additional arrangements aiming at further increasing the safety of the system and/or discourage theft and/or vandalism events by prowlers and/or avoid inconveniences with fair users and/or with the rental service provider.

Figure 7:
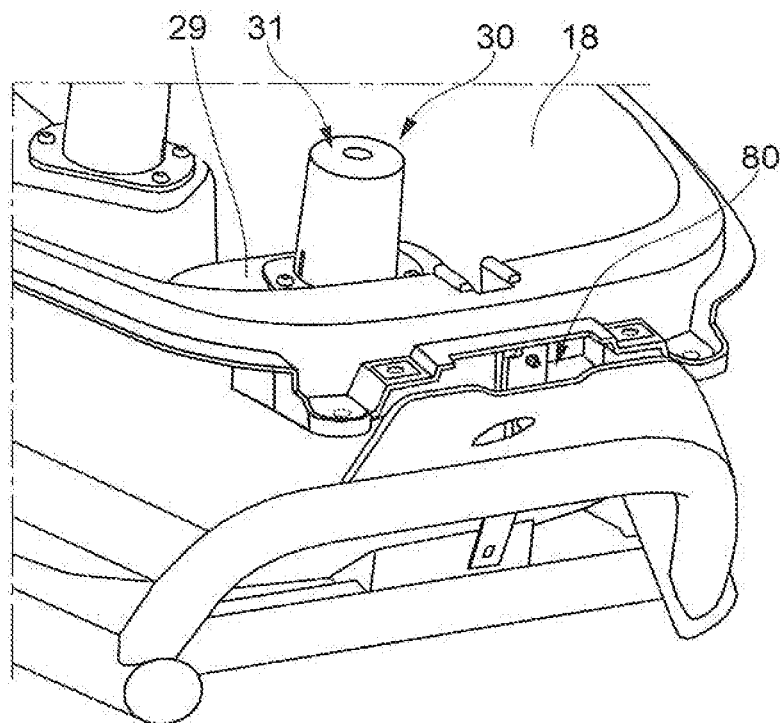
FIG. 7 shows a view of an enlarged part of the storage container of FIG. 3.
Figure 8:
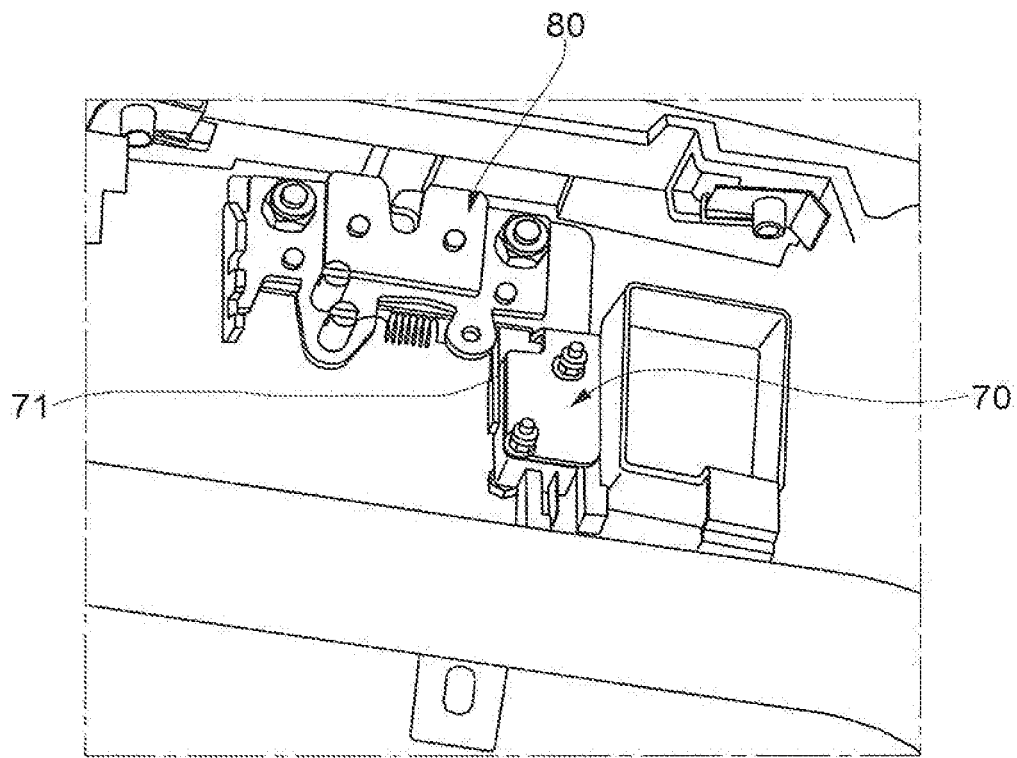
FIG. 8 shows a view of a further enlarged part of the storage container of FIG. 3.

For example, according to one advantageous and non-limiting embodiment, the storage container 10 includes a sensor 70 adapted to detect whether the closing device 12 is in the opening position or in the closing position and wherein said sensor 70 is operatively connected to the second electronic control unit 100 to provide an electrical signal to the latter. Thereby it will be possible to condition the actual end of rental if the electronic control unit 100 detects the closing device 12 in the closing position and if it detects the presence of the object 9 (e.g. a helmet or a pair of helmets) inside the storage container 10. For example, as represented in the FIGS. 7 and 8, the aforesaid sensor 70 is a switch coupled, by means of a mobile arm 71, to a locking device 80 adapted to selectively lock the closing device 12 in the closing position. The locking device 80 is for example mechanically drivable through a key lock and/or electronically drivable for example through a relay, for example to be drivable through a radio control signal for example receivable by the electronic control unit 100 which can send a control signal to the relay.

As above described, the particular embodiments wherein at least a presence detector 30 and/or a closing sensor 70 is provided are advantageous but non-limiting embodiments.

Preferably, the motorcycle 1 includes a key 60 that can be used to start the motorcycle 1 (that is a key suitable to start or halt the motorcycle 1) herein also called ignition key 60 or portable transponder 60.

Preferably, the motorcycle 1 includes one lock unit 90 preferably provided on the limber of the motorcycle 1, or in any case arranged outside the storage container 10, wherein the aforesaid key 60 may be inserted to start and halt the motorcycle engine 1 and/or to lock and unlock the motorcycle 1 steering wheel.

The motorcycle 1 includes an electronic device 61 adapted to detect the presence or absence of the key 60 inside the storage container 10. Preferably, such electronic device 61 is arranged inside the storage container 10, in the internal compartment 11. For example such electronic device 61 is fixed to a supporting wall 65 arranged in the internal compartment 11.

Advantageously, the electronic device 61 allows to authorise the end of rental period if an user places the ignition key 60 into the correct position in the storage container 10. According to one embodiment the electronic device 61 is operatively connected, directly or indirectly through electrical conductors, to the electronic control unit 100 and/or to the electronic control unit 200.

Advantageously, the provision of the electronic device 61 enables to subordinate the actual end of rental (for example of sharing) in case the electronic control unit 100 discerns that the key 60 is inside the storage container 10. In addition, the actual end of rental may also be subordinated to other conditions, for example that also the other electronic control unit 100 detects, thanks to the presence detector 30 (if provided), the presence of the object 9 (for example a helmet or a pair of helmets) inside the storage container 10 and/or detects, through the sensor 70 (if provided) if the closing device 12 is in the closing position.

According to one possible embodiment, the aforesaid electronic device 61 includes for example an antenna RFID housed inside the storage container 10, e.g. fixed to the wall 65 and the key 60 includes an RF-ID tag that can be interrogated via the RFID antenna. It is clear that such RF-ID tag contains (or memorises) an master or slave electronic identification code.

For example the aforesaid ignition key 60 is a mechanical key provided with electronic code (that is a codified key), that is a mechanical key bearing a legible electronic code from the motorcycle 1, for example from the electronic control unit 100 and/or electronic control unit 200, in order to authorize the ignition of the motorcycle 1. For example, the aforesaid electronic code is memorized in the RF-ID tag. For example, the first electronic control unit 200 has a memory unit adapted to memorize at least an electronic identification code (in this case at least two codes, that is the master code and the slave code) and it is such to compare said memorized electronic code through the electronic identification code of the ignition key 60.

Preferably, a housing seat dedicated to the key 60 is provided inside the storage container 1, for example a slot inside which the key 60 can be at least partially inserted in order to be detected by the electronic device 61. Preferably the aforesaid housing seat is a separate seat from the lock unit 90 provided on the motorcycle 1 front chassis wherein the aforesaid key 60 can be inserted to start and halt the motorcycle engine 1 and/or to lock and unlock the motorcycle 1 steering wheel. Preferably the aforesaid housing seat placed inside the storage container 10 is free of a mechanical lock. The aforesaid housing seat is for example fixed to or integrated into the supporting wall 65.

It will be noted that the above mentioned description for the motorcycle 1 also corresponds to the description of one process of authorization control of a motorcycle 1 including:
a supporting structure;
at least two wheels 2,3 constrained to the supporting structure;
a traction engine 4 constrained to the supporting structure and a transmission system 5 adapted to transmit the motion from the traction engine 4 to at least one 3 of the two wheels 2, 3;
a system of authorization control;
wherein:
the electronic system of authorization control includes a first electronic control unit 200 and a second electronic control unit 100 operatively interconnected to each other;

the first electronic control unit 200 is adapted and configured to decide whether the motorcycle 1 is in an authorized or non-authorized usage state;
including the steps of:
interrogating via the first electronic unit 200 a portable transponder 60, which can have a master identification electronic code or a slave identification electronic code, in order to acquire said electronic code;
verifying if said electronic code is correct;
and wherein the process also includes the steps of:
if the first control unit 200 acquires the master identification electronic code, determining that the motorcycle 1 is in the authorized usage state and allowing starting the traction engine independently from the second electronic control unit 100;
if the first control unit 200 acquires the slave identification electronic code, determining that the motorcycle 1 is in the authorized usage state and allowing starting the traction engine 4 if the first control unit 200 receives consent information from the second electronic control unit 100.

From what above described, it is clear that a motorcycle 1 of the above described type enables to fully achieve the objects fixed in order to overcome the drawbacks of the prior art.

In one non-limiting embodiment it is for example possible to envisage that a registered user is equipped with a smart phone application to localize the on-road position of a motorcycle 1 for rental and send a rental request (sharing) of the motorcycle 1 to a remote control centre. After further checking, the remote control centre is such to send a rental authorization signal to the motorcycle 1 (and eventually to the registered user through a smart phone application), and in particular to the second electronic control unit 100.

The receiving of the rental authorization signal on board the vehicle 1 may determine the start of the rental. Such authorization signal allows to unlock automatically the locking device 70 so that the registered and authorized user may open the closing device 12 of the storage container 10 and have access to the internal compartment 11. Thereby the user may take the transponder 60, that is the ignition key 60, which is for example a mechanical key provided with electronic code, and take one or two helmets being part of the rental kit. After moving the closing device 12 into the closing position the user can insert the ignition key 60 in the lock unit 90 to start the motorcycle 1. The lock unit 90 (in a known way) may allow to read the electronic code of the ignition key 60. The first electronic control unit, being operatively connected to the lock unit 90, can verify the presence and correctness of the read electronic code, comparing it with one or more memorized codes and discern whether it is a master or slave code. As a rental provider usually keeps the transponder with the master code and makes available to the users one or more transponders with slave code, the first electronic control unit 200 will detect that the transponder 60 contains a slave code and will interrogate the second electronic control unit 100. If the latter answers in order to provide the consent information, the first control unit 200 will provide the consent to start the motorcycle 1. Thereby the user can cover an authorized trip by motorcycle 1. Now let us suppose that the user intends to leave the motorcycle 1 to end the rental (and for example to set the end of the temporary rental period he is chargeable for). The user thus stops and parks the motorcycle 1, removing the ignition key 60 out of the lock unit 90. By means of the key 60 thereof he can eventually unlock the lock device 80 and have access to the internal compartment 11 of the storage container 10. At this point the user will possibly insert the key into the housing seat inside the storage container 10 in order for the electronic device 61 (if provided) to detect the presence of such key. Preferably, for example through the first electronic control unit 200, the presence and correctness of the key 60 electronic code is checked again. The user can eventually place the helmet in the container 10, positioning it on the slider 31 of the presence detector 30. Thereby, the second electronic control unit 100 detects that the user has fulfilled his obligations, and this process enables to verify that the vehicle (or better the rental kit) is left in a condition suitable to be rent by another user (or by the same user). In doing so the second electronic control unit 100 can determine or detect (eventually after checking the container 10 closure by means of the sensor 70) the end of the rental period by the user and communicate this information to the remote control centre. The system can periodically verify the presence of the ignition key 60 inside the storage container 10 (and possibly of the helmet 9 or helmets 9) when the motorcycle 1 is parked and consequently inform the remote control centre in order to detect potential anomalies.

In case, on the contrary, a prowler has a transponder 60 available with slave code (because he has found it, or he has taken it unduly from another user o because he has opened forcefully the storage container 10) and tries to insert a transponder 60 into the lock unit 90, the first electronic control unit 200 will acquire the slave control code, but will not receive the consent information this time by the second electronic control unit 100 (since it has not been provided by the remote control centre) and will not allow the ignition of the traction engine 4. The same will happen also in case the second electronic control unit 100 does not provide such information, for example because it is non-functioning or damaged, or because it has been unduly removed or unduly replaced with a second electronic control unit 10 not logically paired to the first electronic control unit 200.

The rental service provider or the person in charge of the maintenance of the motorcycles 1 fleet will on the contrary have the transponder with the electronic control master code and will thus be able to regularly use the motorcycle 1 even without consent by the second electronic control unit 200, even in case it has been removed or it is damaged or non-functioning.

According to one further embodiment it is possible to envisage that the system of authorization control includes at least one visual signal element (for example a light on the dashboard of the motorcycle 1 or in another position), controlled by the second electronic control unit 100 to inform the user on the motorcycle 1 state in order to signal:

That the motorcycle is available for the rental (for instance if the light is off);
That the motorcycle is in a state of on-going rental (for instance if the light is fixed);
That the motorcycle has been booked for rental (relatively lower flashing frequency);
That the motorcycle is out of order (relatively higher flashing frequency).

Subject to the principle of the invention, embodiments and implementation details shall be widely varied with respect to what has been disclosed and illustrated by way of example but without limitation, without departing from the scope of the invention as defined in the here enclosed claims.

The invention claimed is:
1. A motorcycle including:
a supporting structure;
at least two wheels constrained to the supporting structure;
a traction engine constrained to the supporting structure and a transmission system adapted to transmit motion from the traction engine to at least one of the two wheels;
an electronic system of authorization control;
wherein:
the electronic system of authorization control includes a first electronic control unit and a second electronic control unit operatively interconnected to each other;
the first electronic control unit is adapted and configured to determine whether the motorcycle is in an authorized or non-authorized usage state;
the first electronic control unit is adapted to interrogate a portable transponder, which can have a master identification electronic code or a slave identification electronic code, in order to acquire said electronic code and to verify if said electronic code is correct;
and wherein:
if the first control unit acquires the master identification electronic code, the first control unit is configured to determine that the motorcycle is in the authorized usage state and is further configured to allow starting the traction engine independently from the second electronic control unit;
if the first control unit acquires the slave identification electronic code, the first control unit is configured to determine that the motorcycle is in the authorized usage state and is further configured to allow starting the traction engine if the first control unit receives consent information from the second electronic control unit.

2. The motorcycle according to claim 1, wherein the first and second electronic control units are configured to communicate with each other by encrypted digital signals.

3. The motorcycle according to claim 2, wherein said signals are encrypted by an encryption key of which a first part is univocally paired to the first electronic control unit and a second part is univocally paired to the second electronic control unit.

4. The motorcycle according to claim 1, wherein the control system includes a LIN BUS or a CAN BUS interconnecting the first and second electronic control unit to each other.

5. The motorcycle according to claim 1, wherein the electronic system of authorization control includes a first interrogating device of the transponder operatively connected to the first electronic control unit.

6. The motorcycle according to claim 5, wherein the electronic system of authorization control includes a second interrogating device of the portable transponder operatively connected to the first electronic control unit, spatially separated from the first interrogating device and housed in a protected access container of the motorcycle.

7. The motorcycle according to claim 6, wherein the protected access container is a storage container.

8. The motorcycle according to claim 1, wherein said portable transponder is a mechanical key with an electronic identification code.

9. The motorcycle according to claim 1, wherein the second electronic control unit includes a wireless communication interface in order to exchange signals between the second electronic control unit and a remote control center.

10. The motorcycle according to claim 9, wherein the second electronic control unit is configured to receive said consent information from the remote control center.

11. The motorcycle according to claim 9, wherein said consent information is representative of a rental authorization of the motorcycle provided by the remote control center.

12. The motorcycle according to claim 1, further comprising a storage container fixed to the supporting structure having an internal compartment and a closing device movable with respect to the supporting structure between a closing position and an opening position in order to prevent access to the internal compartment in the closing position and to allow access to the internal compartment in the opening position.

13. The motorcycle according to claim 12, further comprising an electronic device adapted to detect a presence or absence of the transponder inside the storage container.

14. The motorcycle according to claim 13, wherein the electronic device includes an RFID antenna housed in the storage container and the portable transponder includes a RF-ID tag that can be interrogated via the RFID antenna.

15. The motorcycle according to claim 13, wherein inside the storage container there is provided a housing seat dedicated to the portable transponder, wherein said seat includes a slot inside which the portable transponder can be at least partially inserted in order to be detected by the electronic device.

16. The motorcycle according to claim 13, wherein the storage container includes a presence detector adapted to output an electrical signal representative of the presence and/or absence of at least one object in the internal compartment of the storage container.

17. The motorcycle according to claim 13, wherein the storage container includes a sensor adapted to detect whether the closing device is in the opening position or the closing position.

18. A process of authorization control of a motorcycle, the motorcycle including: a supporting structure; at least two wheels constrained to the supporting structure; a traction engine constrained to the supporting structure and a transmission system adapted to transmit motion from the traction engine to at least one of the two wheels; a system of authorization control; wherein: the electronic system of authorization control includes a first electronic control unit and a second electronic control unit operatively interconnected to each other; the first electronic control unit is adapted and configured to determine whether the motorcycle is in an authorized or non-authorized usage state; the process including the steps of:

interrogating via the first electronic unit a portable transponder, which has a master identification electronic code or a slave identification electronic code, in order to acquire said electronic code;

verifying if said electronic code is correct;

and wherein the process also includes the steps of:

if the first control unit acquires the master identification electronic code, determining that the motorcycle is in the authorized usage state and allowing starting the traction engine independently from the second electronic control unit;

if the first control unit acquires the slave identification electronic code, determining that the motorcycle is in the authorized usage state and allowing starting the traction engine if the first control unit receives consent information from the second electronic control unit.

\* \* \* \* \*